United States Patent [19]

Smith et al.

[11] Patent Number: 5,014,997
[45] Date of Patent: May 14, 1991

[54] BRAKE-CONTROL SYSTEM FOR ACCELERATING FREELY FALLING OBJECTS TO A MOVING CRAFT'S SPEED

[75] Inventors: John A. Smith, Bedford; Mark A. Carlson, Hanover, both of Mass.

[73] Assignee: Sanders Associates, Inc., Nashua, N.H.

[21] Appl. No.: 483,107

[22] Filed: Feb. 22, 1990

Related U.S. Application Data

[63] Continuation of Ser. No. 326,148, Mar. 20, 1989, abandoned.

[51] Int. Cl.$^5$ .............................................. F41J 9/10
[52] U.S. Cl. ................................ 273/360; 244/1 TD; 242/86.7
[58] Field of Search ............................... 273/360, 361

[56] References Cited

U.S. PATENT DOCUMENTS

| | | | |
|---|---|---|---|
| 2,751,167 | 6/1956 | Hopper et al. | 273/361 X |
| 2,760,777 | 8/1956 | Cotton | 273/361 |
| 2,876,963 | 3/1959 | Se Legue et al. | |
| 2,892,599 | 6/1959 | Baldwin et al. | |
| 2,898,588 | 8/1959 | Graham | 273/360 X |
| 2,919,869 | 1/1960 | Hopper et al. | 273/360 X |
| 2,923,549 | 2/1960 | Hopper et al. | 273/361 |
| 2,973,163 | 2/1961 | Goodliffe et al. | 273/360 X |
| 2,991,959 | 7/1961 | Rizzo | 273/361 X |
| 3,373,994 | 3/1968 | Woodward | 273/360 |
| 4,455,961 | 6/1984 | Hansen et al. | 114/254 |
| 4,496,159 | 1/1985 | Dugan et al. | 273/341 |
| 4,834,317 | 5/1989 | Deppner | 273/360 X |

Primary Examiner—William H. Grieb
Attorney, Agent, or Firm—Nutter, McClennen & Fish

[57] ABSTRACT

In a moving craft connected by a towline to an ejected and freely falling object, a brake control system determines when to engage a brake that accelerates the object to the moving craft's speed by retarding the deployment of the towline without exceeding its rated working load. The control system continually monitors the velocity and the total deployed distance of the ejected object. When a point in a velocity-distance state-space plane corresponding to the monitored velocity and the monitored total deployed distance of the ejected object has reached a switching curve (48), the control system actuates a brake (74). The switching curve (48) is the locus of intersection points (38, 40, 42, and 44) of a plurality of pairs of curves, each pair consisting of a free-fall trajectory (23, 24, 26, and 28) and a brake trajectory (30, 32, 34, and 36) and being associated with a different craft velocity. The free-fall trajectory is the trajectory that the object follows after it has been ejected from the craft and is falling away from the craft under the influence of drag. The brake trajectory is the trajectory by which the brake system causes the object to stop at the desired deployment distance.

7 Claims, 5 Drawing Sheets

BRAKE-CONTROL SYSTEM FOR ACCELERATING FREELY FALLING OBJECTS TO A MOVING CRAFT'S SPEED

This application is a continuation application of U.S. patent application Ser. No. 07/326,148, filed on Mar. 20, 1989, now abandoned.

FIELD OF THE INVENTION

The present invention is directed to a brake-control system that controls the deployment rate of a towline connecting a moving craft to an ejected and freely falling object.

BACKGROUND OF THE INVENTION

One method for rapidly deploying an object from a moving craft is to allow the deployed object to fall freely away from the moving craft under the influence of drag until the object reaches the correct deployment distance At that point, the deployment of the towline connecting the craft to the object should stop abruptly so that the object immediately accelerates to the moving craft's speed. The resulting high tension on the towline, however, would usually cause it to break. To avoid such breakage, brake systems have been used to slow the rate of deployment before the object reaches the correct deployment distance and thereby reduce or eliminate the sudden tension increase that would otherwise occur.

Early brake-control systems were often arranged to enable a human operator to control the deployment rate manually and thereby bring the speed of the object with respect to the craft below the level that results in breakage In one example of this type of system, a brake engaged automatically when the relative object speed fell below a threshold. Nonetheless, such systems depended on the skill of the operator to achieve the fastest possible towline deployment without towline breakage.

More-recent systems have deployed brakes automatically in response to deployment distance. One such system prevents the deployment rate from exceeding a predetermined limit, and, when the object reaches a preset distance, it engages a brake system to slow the object to a stop at the desired deployment distance. Although such systems eliminate the need for human control, their use of fixed deployment speed and brake-engagement distance prevents them from deploying these objects in minimum times for all craft speeds.

SUMMARY OF THE INVENTION

The brake control system of the present invention controls object deployment in a manner that is dependent on craft speed so as to achieve the fastest deployment at all craft speeds without breaking the towline, but it does so without explicitly monitoring the speed of the moving craft. Specifically, this system initially allows the object to fall freely from the moving craft. The system then continuously monitors the velocity and the deployed distance of the ejected object. When a point in a velocity-distance state-space plane defined by the monitored velocity and the deployed distance of the object reaches a switching curve described below, the control system engages a brake. This engaged brake reduces the deployment rate of the towline, which correspondingly accelerates the object to the craft's speed.

The switching curve is such that the resulting object acceleration causes the object to reach the craft speed just as the object reaches the desired deployment distance. Specifically, the switching curve is the locus of intersection points for a plurality of pairs of curves, each pair consisting of a free-fall trajectory and a brake trajectory and being associated with a different craft velocity. The free-fall trajectory is the trajectory that the object, for the given craft speed, follows after it has been ejected and has started falling away from the moving craft under the influence of drag. Correspondingly, the brake trajectory is the trajectory that, for the given craft speed and brake system, results in the object's stopping at the desired deployment distance.

The present invention thus determines the braking point that is optimum for the current craft speed, but it does so without monitoring craft speed explicitly.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

The illustrated embodiment of the present invention determines when to engage a brake system that accelerates a previously freely falling object such as an aerial drogue to the speed of a moving craft such as an airplane by slowing to a stop the deployment of a towline that connects the craft to the object. Specifically, for the current velocity of the moving craft, the system determines the maximum deployment distance at which the brake can be engaged and still accelerate an ejected object to the craft's speed by the time the object reaches the desired deployment distance. The illustrated embodiment can thereby achieve the deployment and braking of the object that are optimum for the current craft speed and brake employed.

Figure 1:
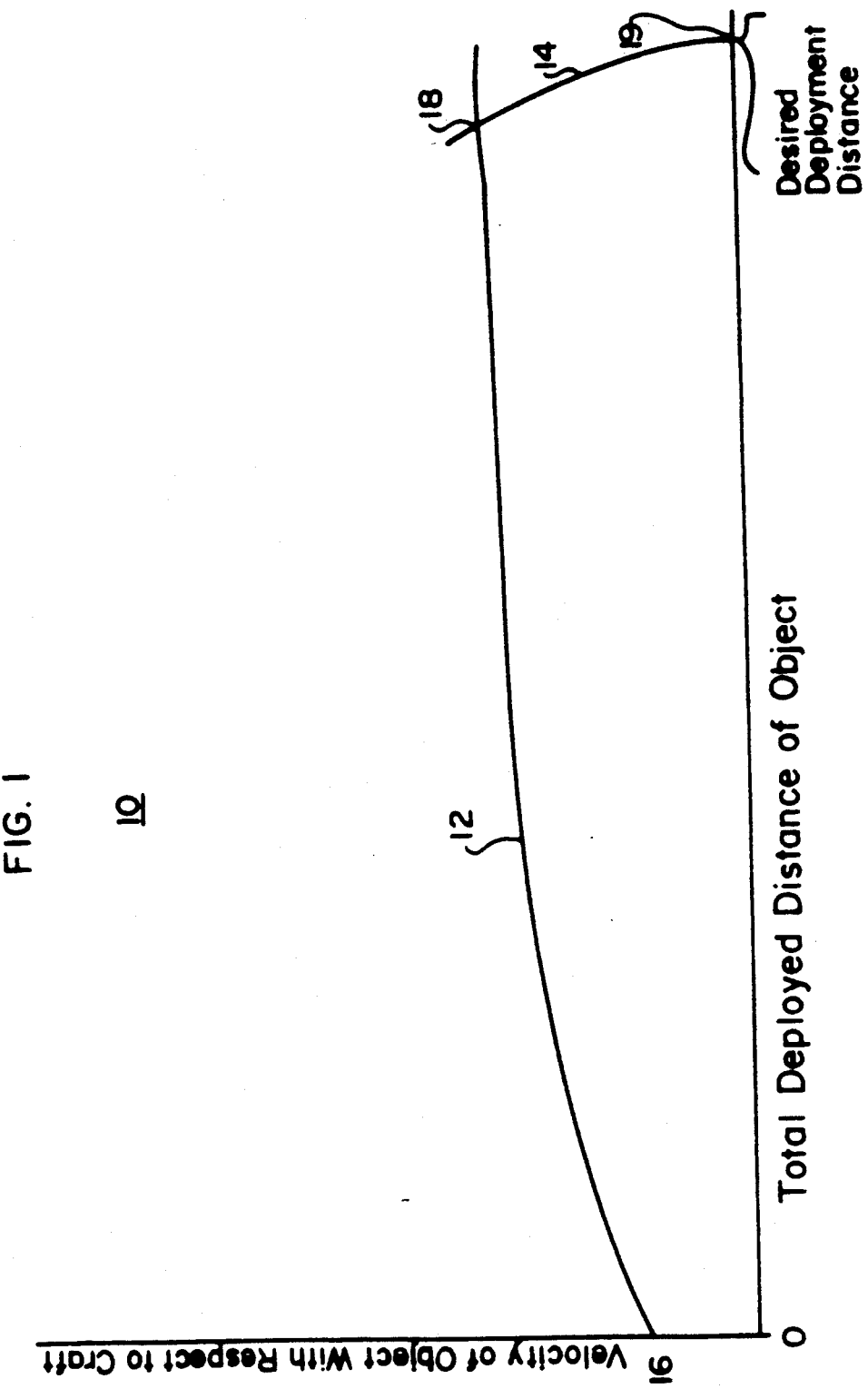
FIG. 1 is a velocity-distance state-space diagram containing a free-fall trajectory and a corresponding brake trajectory for a given object, a given brake system, and a specific velocity of the moving craft.

FIG. 1 depicts the trajectory 12, in a velocity-distance state-space plane 10, of an object falling freely under the influence of drag forces after having been ejected at an initial velocity 16 from a craft moving at a given craft speed. FIG. 1 also depicts a corresponding brake trajectory 14, which the object follows after a given brake has been engaged to slow towline deployment to a stop and thus accelerate the object to the craft's speed, i.e., to a relative velocity of zero with respect to the craft. There is an infinite number of such braking trajectories for the given brake system and craft speed, but trajectory 14 is the only one that includes the point 19 that represents the object's achieving the craft speed at the desired deployment distance. When the freely falling object reaches the deployment distance and velocity represented by the intersection 18 of the free-fall trajectory 12 and the breaking curve 14, the system engages its brake. The object thereupon follows the braking trajectory 14.

Trajectory 14 can be determined by setting the kinetic energy of the system to the energy that the brake will dissipate if it is engaged between the current deployment distance and the desired deployment distance. Specifically, the energy that the brake system will dissipate between the current deployment distance and the desired deployment distance is given by:

$$Q = [T(l) - F](l_0 - l),$$

where:
T is the tension imposed by the brake,
F is any external force on the object,
$l_0$ is the desired deployment distance of the towline, and
l is the current deployment distance.

It should be noted that the braking load T is expressed as a function of deployment distance l. Optimally, T(l) should be a constant equal to the working load of the towline. As a practical matter, however, it may be necessary to employ a brake system that does not result in a constant tension, and the brake curve should reflect the relationship between tension and deployment distance.

The kinetic energy of the system is given by:

$$KE = \tfrac{1}{2} MV^2 + \tfrac{1}{2} IW^2,$$

Where:
M is the mass of the body,
V = dl/dt is the velocity of the body relative to the craft,
I is the moment of inertia of the reel by which the towline is being deployed, and
W is the angular velocity of the reel.

By expressing W in terms of V and setting the above expression for kinetic energy equal to the one for energy to be dissipated, the relationship between l and dl/dt can be obtained which is the braking curve 14. The factor F, i.e., all external forces, includes drag forces, which differ for different craft speeds. Different craft speeds, thus result in different brake trajectories. Drag also affects the free-fall trajectory, so different craft speeds also result in different free-fall trajectories.

Figure 2:
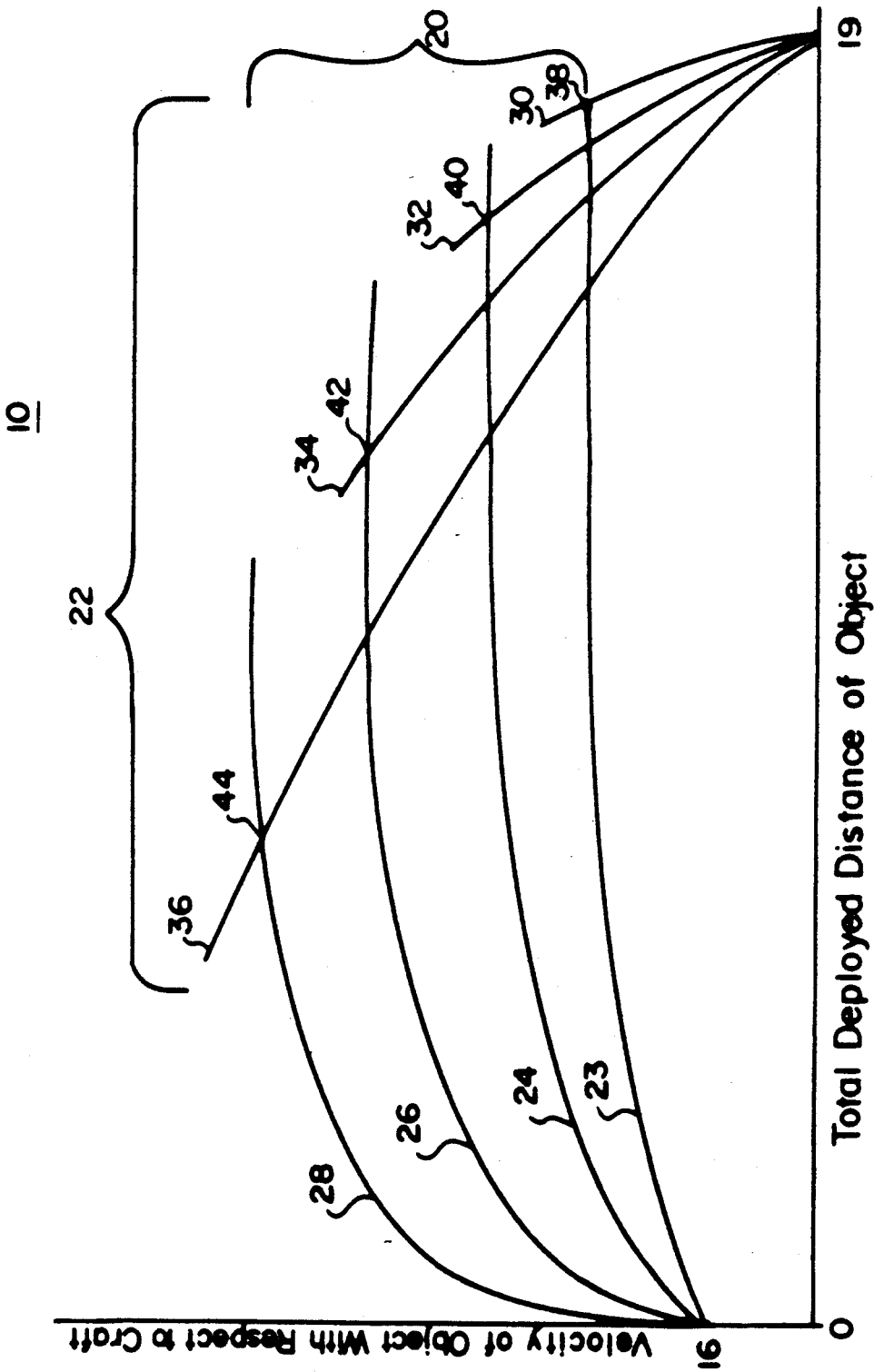
FIG. 2 is a velocity-distance state-space diagram containing a plurality of free-fall trajectories and a corresponding plurality of brake trajectories for a given object, a given brake system, and numerous velocities of the moving craft.

FIG. 2 depicts a plurality of free-fall trajectories 20 and a corresponding plurality of brake trajectories 22 for a plurality of different specific craft velocities. Curves 23, 24, 26, and 28 are the different trajectories that an object ejected at a known initial velocity 16 will take when the craft is moving at different selected craft velocities. Similarly, trajectories 30, 32, 34, and 36 are the brake trajectories for the same craft velocities. The intersection of each free-fall trajectory with its corresponding brake trajectory defines the switching point for the specific craft velocity on which the trajectory pair was based. In FIG. 2, switching points 38, 40, 42, and 44 represent the different points at which the brake system should engage for different craft speeds. As will now be demonstrated in connection with FIG. 3, however, it is not necessary to monitor craft speed explicitly in order to brake at the appropriate point.

Figure 3:
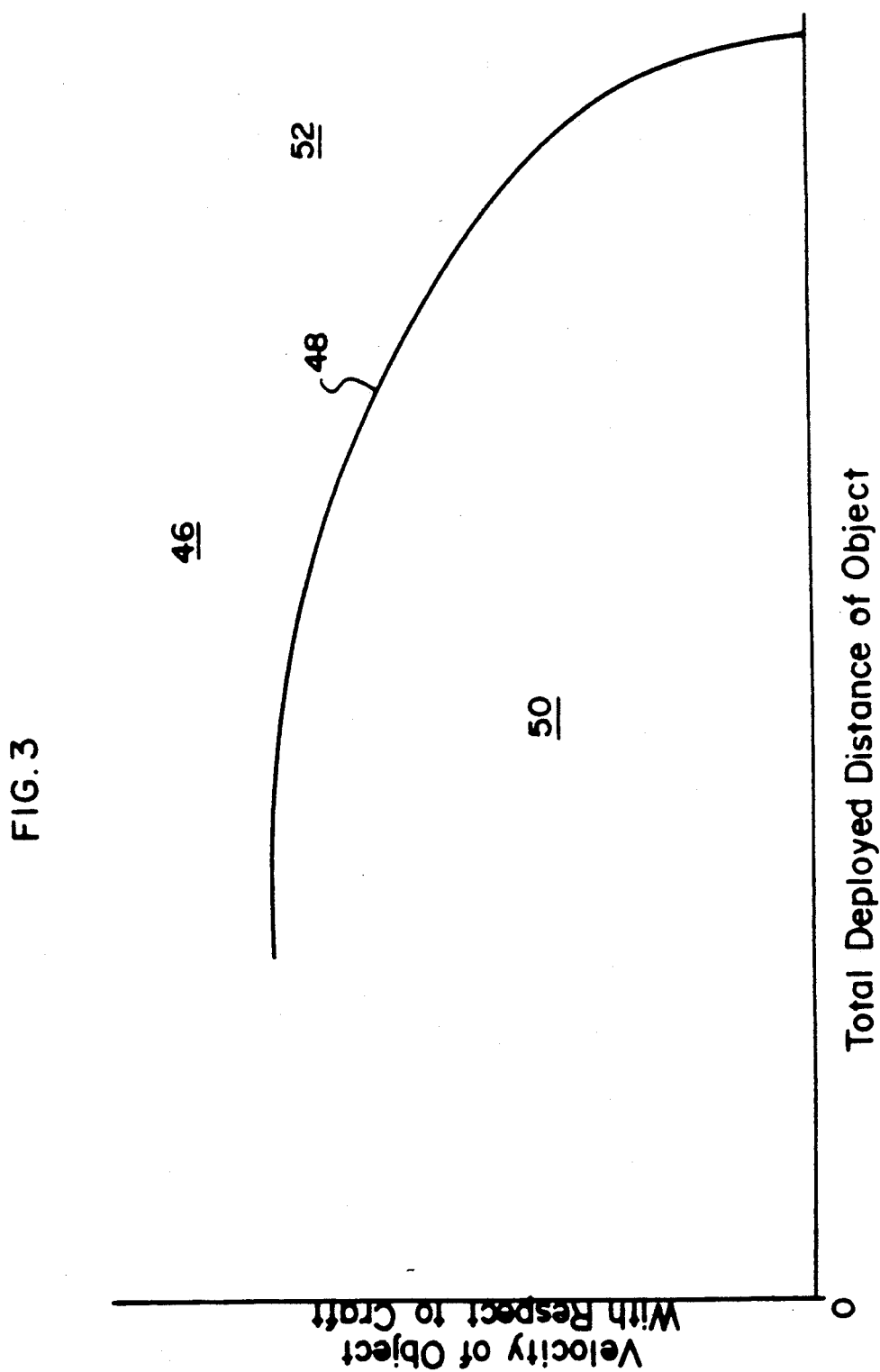
FIG. 3 is a velocity-distance state-space diagram containing a switching curve that is the locus of intersection points for all pairs of free-fall trajectories and corresponding brake trajectories represented in FIG. 2.

The switching points for the entire flight envelope of the moving craft will be referred to as the "switching curve," which is illustrated in FIG. 3. As FIG. 3 illustrates, the switching curve 48 separates the velocity-distance state-space plane 46 into two regions. One region, the free-fall region 50, contains the state-space points that lie below the switching curve 48, while the second region, the brake region, 52, contains all the state-space points that lie above the switching curve 48.

The brake-control system of the present invention monitors both the velocity and the total deployed distance of the ejected object. So long as the state-space point defined by the velocity and the total deployed distance of the object falls into the free-fall region 50, the deployment system continues to allow the ejected object to accelerate freely away from the moving craft. As soon as the state-space point defined by the combination of the velocity and the total deployed distance of the object falls into the brake region 52, however, the control system engages the brake. If the velocity and distance measurements are updated frequently enough, the brake system should engage essentially right at the switching curve so that the object accelerates to the craft's speed along the brake trajectory corresponding to the craft's current speed, even though the control system does not monitor craft speed explicitly.

Figure 4:
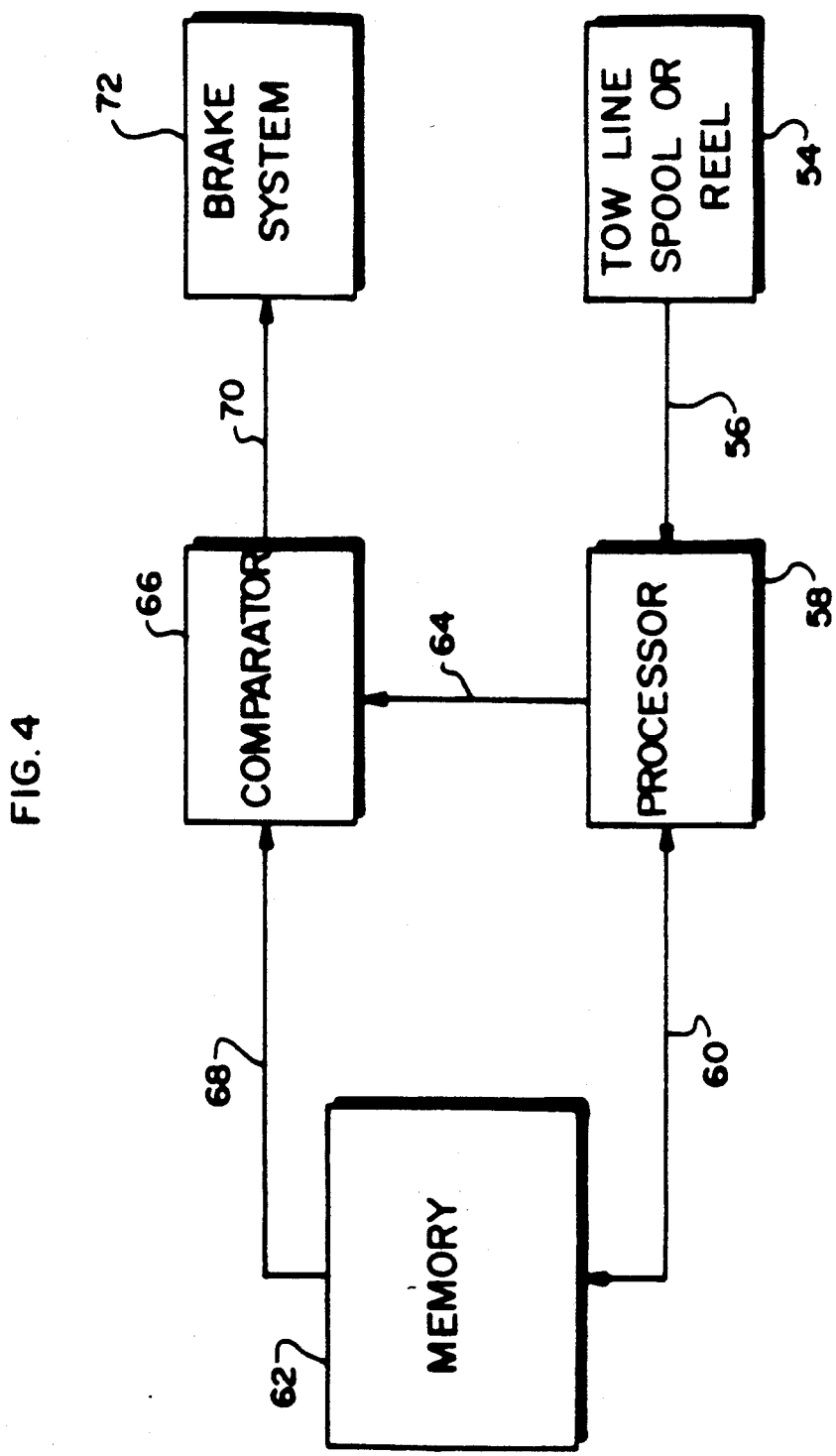
FIG. 4 is a block diagram of a deployment system incorporating the present invention.

FIG. 4 depicts hardware for determining when the state-space position of the object has reached the switching curve and for engaging the brake in response. A light detector (not shown) upon sensing the passing of a light emitter (not shown) located on the rotating reel 54 transmits an emitter pulse on the line 56 to the processor 58 once for each complete rotation of the reel 54. From the time interval between emitter pulses, the processor 58 determines the present speed of the deployed object with respect to the craft. Furthermore, by counting the total number of emitter pulses and knowing the geometry of the reel, the diameter of the towline and the wrap configuration of the towline on the reel, the processor 58 calculates the present total deployed distance of the object and stores it in the memory 62.

The memory 62 further stores switching-curve data, and the processor 58 uses the total deployed distance to retrieve from the memory 62 the deployment velocity that the switching curve associates with that total deployed distance. This deployment velocity is sent by way of line 68 to a comparator 66, which compares it with the present deployment velocity, which the processor 58 sends it on a line 64. If the present velocity equals or exceeds the retrieved velocity, the point in state space that the object's deployment distance and speed define is on the switching curve or in the brake region 52, so the comparator 66 sends a brake signal on a line 70 to a brake system 72 to cause it to initiate towline deceleration. The brake system thereupon brakes the reel 54, and the object therefore follows a brake trajectory by which it reaches the craft velocity and correct deployment distance simultaneously.

Figure 5:
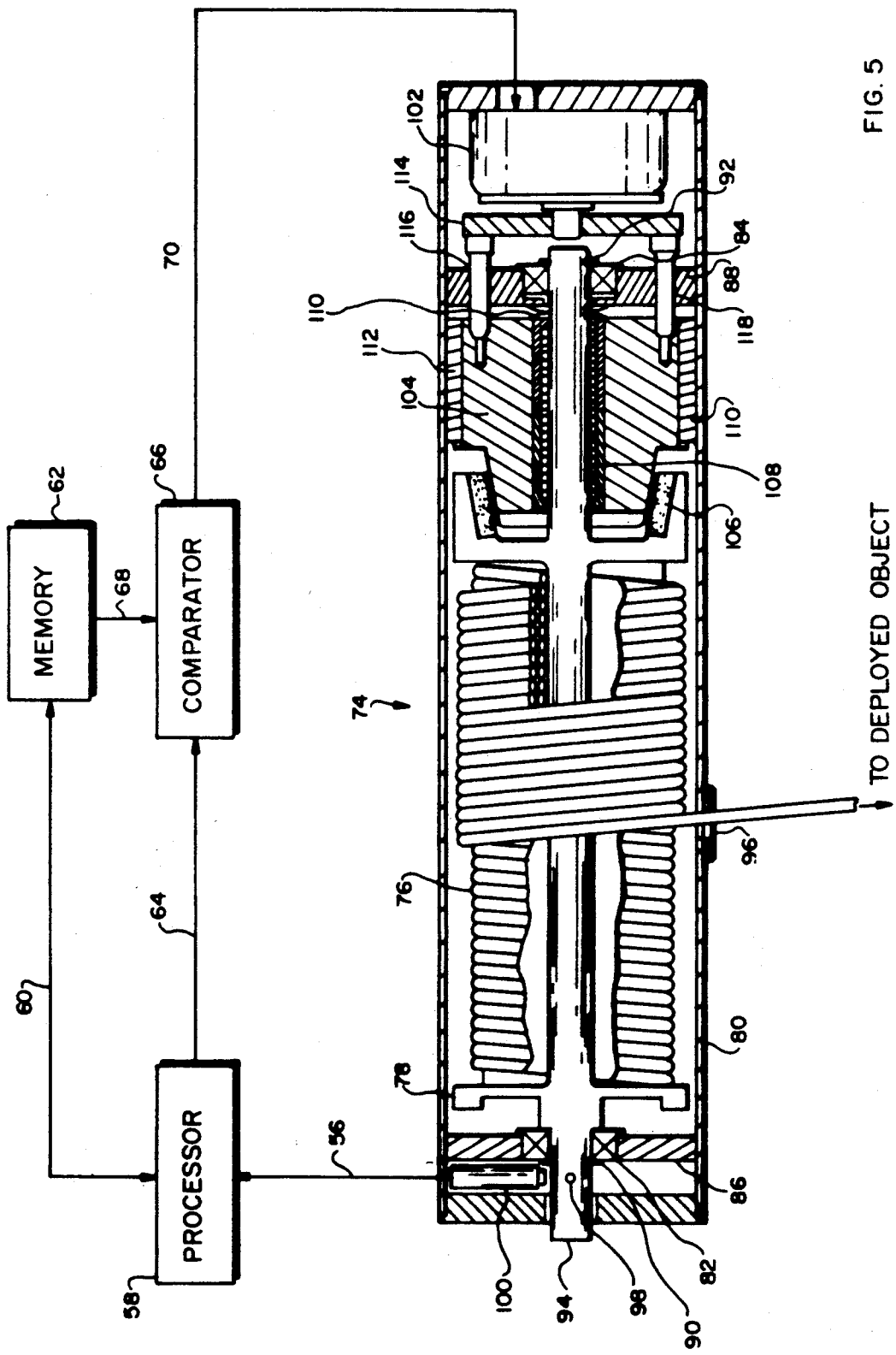
FIG. 5 is a cone brake system used in the illustrated embodiment to brake an aerial drogue deployed from an aircraft.

FIG. 5 depicts the mechanical arrangement of the towline reel 54 and the brake 72. This arrangement includes a cone brake system 74 which has multiple layers of towline 76 wound around a rotatable reel 78 housed within a reel shroud 80. The towline 76 runs from the reel 78 through a cable-feed opening 96 and is attached to the deployed object (not shown). Fore and aft main bearings 82 and 84, respectively, and fore and aft support bulkheads 86 and 88, respectively, support a reel shaft 94 while allowing the shaft to rotate within the reel shroud 80. Fore and aft E-rings 90 and 92, respectively, prevent the reel shaft 94 from walking horizontally as the towline 76 unwinds from the rotating reel 78. A light emitter 98 mounted on the reel shaft 94 and a light detector 100 mounted on the shroud 80 act together to generate pulses from which the processor 58 can determine the total number of turns and the angular frequency of the reel 78 while the towline 76 is being deployed.

The brake portion of this system consists of a linear solenoid 102, a brake body 104, and a brake lining 106 on the rotatable reel 78. A plurality of linear bearings 108 allows the reel shaft 94 to rotate while the brake body 104 remains stationary. The brake body 104 has a plurality of mating grooves (not shown) mated together with a plurality of brake keys 110 and 112 mounted on the inner wall of the reel shroud 80. These brake keys 110 and 112 allow the brake body to slide easily as brake pressure increases, but they prevent any angular rotation of the brake body 104. A set of preset springs 120 acts between bulkhead 84 and the body 104 to provide a minimum tension on the deploying towline 78 by producing a corresponding minimum torque on the brake lining 106. The solenoid 102 receives the electrical brake command and actuates the brake through an actuator plate 114 containing two actuator pins 116 and 118 attached to the brake body 104. A third actuator pin is not shown, but is located behind the reel shaft 94.

In operation, the towline 76 begins unwinding when the deployed object falls freely away from the moving craft and the reel 78 begins to rotate. As the reel 78 and the reel shaft 94 start rotating, the light detector 100 senses the passing of the rotating light emitter 98 and sends one emitter pulse on line 56 to the processor 58 for each rotation. When the processor 58 receives the emitter pulses, it processes them in the manner described above to determine when to apply the brake.

When the comparator 66 determines that the time has come to apply the brake, it sends a brake signal over line 70 to the solenoid 102. In response, the solenoid forces the actuator plate 114 forward. As a result of this force, the brake body 104 pushes against the brake lining 106 of the rotating reel 78. The resulting friction between the stationary brake body 104 and the rotating brake lining 106 causes a torque that reduces the rate of rotation of the reel. The reel 78 therefore slows, and it eventually stops rotating just when the object reaches the correct deployment distance behind the moving craft.

The foregoing description has been limited to a specific embodiment of this invention. It will be apparent, however, that variations and modifications may be made to the invention, with the attainment of some or all of the advantages of the invention. Specifically, this invention can be used to minimize the deployment time of an object ejected from a moving craft either horizontally, as from an airplane, or vertically, as from a helicopter or rocket. Furthermore, the deployment medium for the ejected object can be not only air but also other fluids, such as water. Therefore, it is the object of the appended claims to cover all such variations and modifications as come within the true spirit and scope of the invention.

What is claimed is:

1. A method of controlling the deployment of a towline connecting a moving craft to an ejected object, the method comprising the steps of:
   a. allowing the object to fall freely from the craft;
   b. continuously monitoring the velocity and the total deployed distance of the object relative to the moving craft as it is falling freely;
   c. continuously determining whether a point in a velocity-distance state-space plane defined by the monitored velocity and the monitored total deployed distance of the object has reached a switching curve, the switching curve comprising a locus of points of intersection of a plurality of free-fall trajectories of the object with a corresponding plurality of brake trajectories of the object, each of the plurality of free-fall trajectories being the trajectory followed by the object at a different velocity of the moving craft, each of the plurality of brake trajectories being the trajectory followed by the object, for a different craft speed, when a given brake system is engaged to retard the deployment of the towline; and
   d. in response to a determination that the point in the velocity-distance state-space plane defined by the monitored velocity and total deployed distance has reached the switching curve, engaging the given brake system to retard the deployment of the towline.

2. A method as defined in claim 1 wherein:
   a. the towline has a rated breaking tension; and
   b. the given brake system applies to the towline a tension less than the breaking tension when it is engaged.

3. For controlling the deployment of a towline connecting a moving craft to an ejected and object, an object-deployment system comprising:
   a. sensor means for continuously monitoring the total deployed distance of the object and the velocity of the object with respect to the craft and for generating an indication thereof;
   b. a brake system, adapted for application of a brake signal thereto, for engaging in response to the brake signal to retard the deployment of the towline; and
   c. means responsive to the sensor means for continuously determining whether a point in a velocity-distance state-space plane defined by the monitored velocity and the monitored total deployed distance has reached a switching curve in the velocity-distance state-space plane and for generating a brake signal if it has, the switching curve comprising a locus of points of intersection of a plurality of free-fall trajectories of the object with a corresponding plurality of brake trajectories of the object, each of the plurality of free-fall trajectories being the trajectory followed by the object at a different velocity of the moving craft, each of the plurality of brake trajectories being the trajectory followed by the object, for a different craft speed, when the brake system is engaged to retard the deployment of the towline.

4. An object-deployment system as defined in claim 3 wherein:
   a. the towline has a rated breaking tension; and
   b. the brake system applies a tension less than the breaking tension when it is engaged.

5. An object-deployment system as defined in claim 3 wherein:
   a. the system further includes a rotatably mounted reel about which the towline is wound in such a manner that the towline deploys as the reel rotates and the towline stops deployment when the reel stops rotating; and b. the brake system comprises means for retarding the rotation of the reel when the brake system engages.

6. An object-deployment system as defined in claim 5 wherein:
   a. the reel further includes a brake-engagement surface; and
   b. the brake system comprises:
      i. a brake body;
      ii. a solenoid attached to the brake body and operable between an engaged state, in which it urges the brake body against the brake-engagement surface to apply frictional force thereto to tend to retard rotation of the reel, and a disengaged state, in which it refrains from urging the brake body against the brake-engagement surface; and
      iii. means responsive to the brake signal to operate the solenoid to its engaged state in response to reception of the brake signal.

7. An object-deployment system as defined in claim 6 wherein:
   a. the brake body is generally frustoconical; and
   b. the brake-engagement surface shaped complimentarily to the brake body.

* * * * *